US006463889B2

(12) United States Patent

Reddy

(10) Patent No.: US 6,463,889 B2
(45) Date of Patent: Oct. 15, 2002

(54) POX COLD START VAPOR SYSTEM

(75) Inventor: Sam Raghuma Reddy, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 36 days.

(21) Appl. No.: 09/800,612

(22) Filed: Mar. 8, 2001

(65) Prior Publication Data

US 2002/0124836 A1 Sep. 12, 2002

(51) Int. Cl.$^{7}$ .......................... F02B 43/10; H01M 8/06

(52) U.S. Cl. ............................ 123/3; 123/519; 429/17; 429/19

(58) Field of Search ............................ 123/1 A, 3, 518, 123/519, 520; 429/12, 13, 17, 19, 20

(56) References Cited

U.S. PATENT DOCUMENTS

| | | | | | |
|---|---|---|---|---|---|
| 3,906,915 | A | * | 9/1975 | Bednarczyk et al. | 123/3 X |
| 5,248,566 | A | * | 9/1993 | Kumar et al. | 429/19 |
| 6,311,649 | B1 | * | 11/2001 | Ma | 123/3 |
| 6,311,650 | B1 | * | 11/2001 | Lamm | 123/3 |

* cited by examiner

*Primary Examiner*—Tony M. Argenbright
(74) *Attorney, Agent, or Firm*—Kathryn A. Marra

(57) ABSTRACT

A gasoline vapor storage canister is employed to temporarily store hydrocarbon vapors vented from the gas tank in an automotive vehicle using an engine or fuel cell motive means which is fuelled at least in part from an on-board-the-vehicle, partial oxidation (POx) reactor for converting gasoline to a hydrogen-containing POx fuel. During cold start situations, gasoline vapor is purged from the storage canister to supply a stream of combustible fuel/air mixture to the POx reactor for ignition and heat up of the catalytic reactor to its operating temperature.

14 Claims, 2 Drawing Sheets

POX COLD START VAPOR SYSTEM

TECHNICAL FIELD

This invention pertains to the use of on-board gasoline partial oxidation systems on automotive vehicles. More specifically, this invention pertains to methods and apparatus for storing and using fuel vapor for cold starting a partial oxidation reactor of an internal combustion engine-powered vehicle or a fuel cell-powered vehicle.

BACKGROUND OF THE INVENTION

Automobile manufacturers continue to develop methods and apparatus for reducing the exhaust emissions of cars and trucks. One avenue of development is the use of hydrogen-containing fuels in both internal combustion engines and fuel cells. Hydrogen burns cleaner and in more fuel lean mixtures with air than gasoline. Since hydrogen is difficult to store and carry on the automobile, practices are being developed to make hydrogen on-board the vehicle by the partial oxidation of gasoline hydrocarbons to reform them as hydrogen and carbon monoxide. Carbon monoxide is usually removed by a separate processor for fuel cell applications.

Thus, on-board gasoline partial oxidation (POx) reforming is one of the technologies being considered for very low emission vehicles. A POx reformer combines gasoline and air under very fuel-rich conditions to produce hydrogen-rich POx gas as shown below:

$$C_8H_{18}+19\ \text{Air}\ (4O_2+15N_2)=9H_2+8CO+15N_2+\text{Heat}$$

It is known that adding hydrogen to gasoline allows a spark ignition, internal combustion engine to run very lean due to hydrogen's wide flammability limit. Leaner mixtures provide relatively low combustion temperatures, which lower engine out NOx. Gasoline can be carried on the vehicle in a conventional fuel tank and pumped from the tank in separate streams to the fuel injection system of the engine and to a POx reactor. The output of the POx reactor is also added in controlled amounts to the fuel induction system of the engine for mixing with gasoline vapor and air in the combustion chamber of the engine. The POx reactor can also be used when the vehicle is powered using a fuel cell of the type in which hydrogen is reacted electrochemically with oxygen for electric power generation in the vehicle.

Even with the advent of partial or total fueling of a vehicle using gasoline and a POx reactor, there remains the problem of cold start of the POx reactor and the engine or fuel cell. It is an object of this invention to provide methods and apparatus for the cold starting of a rector utilized on a car or truck for the partial oxidation of gasoline and the reforming of gasoline to a hydrogen containing fuel.

SUMMARY OF THE INVENTION

This invention is applicable on vehicles that store liquid gasoline in a fuel tank for delivery to an internal combustion engine and/or a fuel cell for producing motive power for the vehicle.

In the case of the gasoline-powered engine, the fuel storage and delivery system usually comprises a fuel tank, often at the rear of the vehicle, and a fuel line through which liquid gasoline is pumped to the fuel induction system of the vehicle's spark ignition engine. The fuel induction system, in turn, comprises a fuel rail supplying a solenoid-actuated fuel injector for each cylinder of the engine. As is known, the timing and duration of activation of the respective fuel injectors is managed by a suitable engine control module comprising sensors and a suitably-programmed computer. When POx fuel is used in combination with gasoline, a separate fuel line supplies gasoline to the POx reactor and a line from the reactor supplies the hydrogen-containing fuel to a separate engine fuel injection system which is also under the control of the engine control module.

In the case of the fuel cell power system, the fuel storage and delivery system also comprises a gasoline fuel tank and fuel line through which gasoline is pumped to the POx reactor. The hydrogen-containing fuel from the reactor is further processed, if necessary, to remove carbon monoxide and then conducted to the fuel cell. Again, the delivery of gasoline to the reactor and the delivery of POx fuel to the cell(s) is usually controlled by a control system of sensors and a suitably programmed computer responsive to the power demands of the vehicle on the fuel cell. As is known, the electrical power output of the cell is used to drive the vehicle's electric motor(s) or stored in a storage battery.

The on-board vehicle fuel tank for either the engine or fuel cell will usually be provided with a fuel evaporation control system to collect fuel vapor produced during tank refills or fuel evaporated at other times. The vehicle fuel tank experiences ambient temperature changes and other fuel heating events that cause fuel evaporation. Since fuel tanks are not intended to contain gasoline under high pressure, they are normally vented to a suitable fuel evaporation control (EVAP) canister containing activated carbon granules that adsorb and temporarily store evaporated fuel vapor. It is temporarily stored, gasoline vapor that is used in accordance with this invention to facilitate the cold start of the vehicle's POx reactor. The practice of this invention is useful whether the hydrogen-containing product of the reactor is fed to an engine or fuel cell.

In accordance with the invention, the vehicle's fuel tank is vented first and directly to a suitable POx vapor accumulator canister. The canister may be a cylindrical, molded thermoplastic container provided with a vapor inlet and a vapor purge outlet and a vapor vent outlet/purge air inlet. The canister is filled with a bed of particles of a suitable fuel adsorption media such as activated carbon. The design of the POx vapor accumulator canister is preferably such that vapor enters at the vapor inlet and must traverse the whole bed of adsorbent carbon before exiting the vent outlet. The vapor purge outlet is located at the vapor inlet end of the vapor flow path through the bed. And the purge outlet is connected through a suitable vapor duct to the inlet of the POx reactor. The vent outlet, which may exhaust to the atmosphere, is preferably connected to the vapor inlet of a suitable familiar (EVAP) canister. Thus, overflow from the POx vapor accumulator canister is stored in an EVAP canister which is purged directly to the engine fuel system intake as permitted by the engine control computer during engine operation in the known manner.

When engine or fuel cell cold start is to occur, stored fuel vapor from the POx vapor accumulator canister is drawn through the purge vent and duct from the adsorbent bed with reverse air flow through the overflow vent by operation of the engine POx fuel delivery system to the inlet of the POx reactor. The fuel vapor purged from the POx accumulator canister is typically rich in butanes and pentanes which are particularly suitable for POx reactor cold start. In a preferred embodiment of the invention, the C4–C5 mixture with air flows past an oxygen sensor, or the like, to estimate the air-to-fuel mass ratio (A/F) in the purge stream. Additional ambient air is drawn into the purge line upstream of the cold POx reactor to provide a suitable A/F (e.g., about 15) for combustion at the reactor inlet.

At the inlet of the cold POx reactor, the air-purged fuel mixture is ignited using any suitable means. For example, a glow plug or a spark plug may be activated at the reactor entrance to ignite the combustible mixture. The POx reactor may be of known design for such purpose. In other words, the reactor is of flow-through design in which the flow passages utilize a surface catalyst to promote the partial oxidation reaction. The burning of the ignited combustible mixture heats the catalyzed surfaces in a period of a few seconds or so to a suitable temperature for continued operation. For example, the burning of the combustible air-fuel mixture may be employed to heat the POx reactor to an operating temperature of 800° C. or so, and then the fuel supply switched to liquid gasoline at a suitable A/F for POx reaction. In another mode of operation, the combustible purged vapor air mixture is used to heat the POx reactor to a light off temperature of 400° C. and then the A/F of the mixture reduced to about 5 to generate POx gas in the reactor to continue heat up to 800° C. and for POx fuel for engine cold start.

Thus, the use of a POx reactor vapor accumulator canister and purge vent in combination with the fuel tank and POx reactor for either an engine or fuel cell permits the use of specially stored and purged fuel vapor in the start up of a cold (ambient temperature) POx reactor. The quick heat-up of the reactor using stored evaporative fuel permits the faster introduction of POx fuel into the cold engine and/or fuel cell during start-up to reduce exhaust emissions and increase efficiency of the motive power source. While the cold engine may be rapidly started on 100% gasoline in accordance with known practices, the rapid start-up of the POx reactor using this invention permits faster operation in the fuel-lean mode obtained only by POx fuel addition and the resulting improvements in efficiency and emissions reduction.

Other objects and advantages of the invention will become more apparent from a detailed description of the invention which follows.

DESCRIPTION OF THE PREFERRED EMBODIMENT

It is known that adding hydrogen to gasoline allows an engine to run very lean due to hydrogen's wide flammability limit. Leaner mixtures provide lower combustion temperatures, which reduce the quantity of nitrogen oxides (NOx) exhausted from the engine. At the present time, known hydrogen storage systems are not practical for carrying molecular hydrogen on an automobile. But gasoline can be carried in a conventional fuel tank and converted to a hydrogen gas-rich fuel using a suitable catalytic reactor for partially oxidizing gasoline to hydrogen and carbon monoxide. As stated, such a reactor is sometimes called a POx reactor and the reaction product POx gas.

Because of the rich hydrogen content, 100% POx gas can be used for cold starting of an internal combustion engine with very low emissions of hydrocarbons, carbon monoxide and NOx even at severe winter temperatures. Cold start emissions can also be controlled by using expensive and complicated hydrocarbon adsorbers and electrically-heated catalysts. The difficulty is in generating POx gas at low temperatures for cold start. For generating POx gas at low temperatures, the POx reformer needs vaporized gasoline and a heated catalyst. These requirements have appeared to require a costly and complicated POx reactor catalyst heating system. Moreover, it has been assumed to be necessary to delay the starting of the engine at cold ambient conditions until the POx reactor could be heated to its light-off temperature with such a heating system.

The problem of cold start of a POx reactor is also a challenge in the case of gasoline-based fuel cell vehicles. Gasoline is partially oxidized and treated to generate CO-free hydrogen which is used in fuel cell stack to generate electrical power. But at start-up under cold ambient conditions, the availability of hydrogen to the fuel cell must await the startup of a POx reactor with a catalyst, typically a noble metal catalyst such as palladium or a platinum-ruthenium mixture, that must be heated to several hundred degrees Celsius before it is active for the POx reaction.

This invention provides a POx cold start system which is based on using stored evaporative fuel vapors. The system is applicable to automotive engines using POx fuel made from gasoline and to gasoline-based fuel cell vehicle POx cold start.

Description of System

Figures 1, 2:
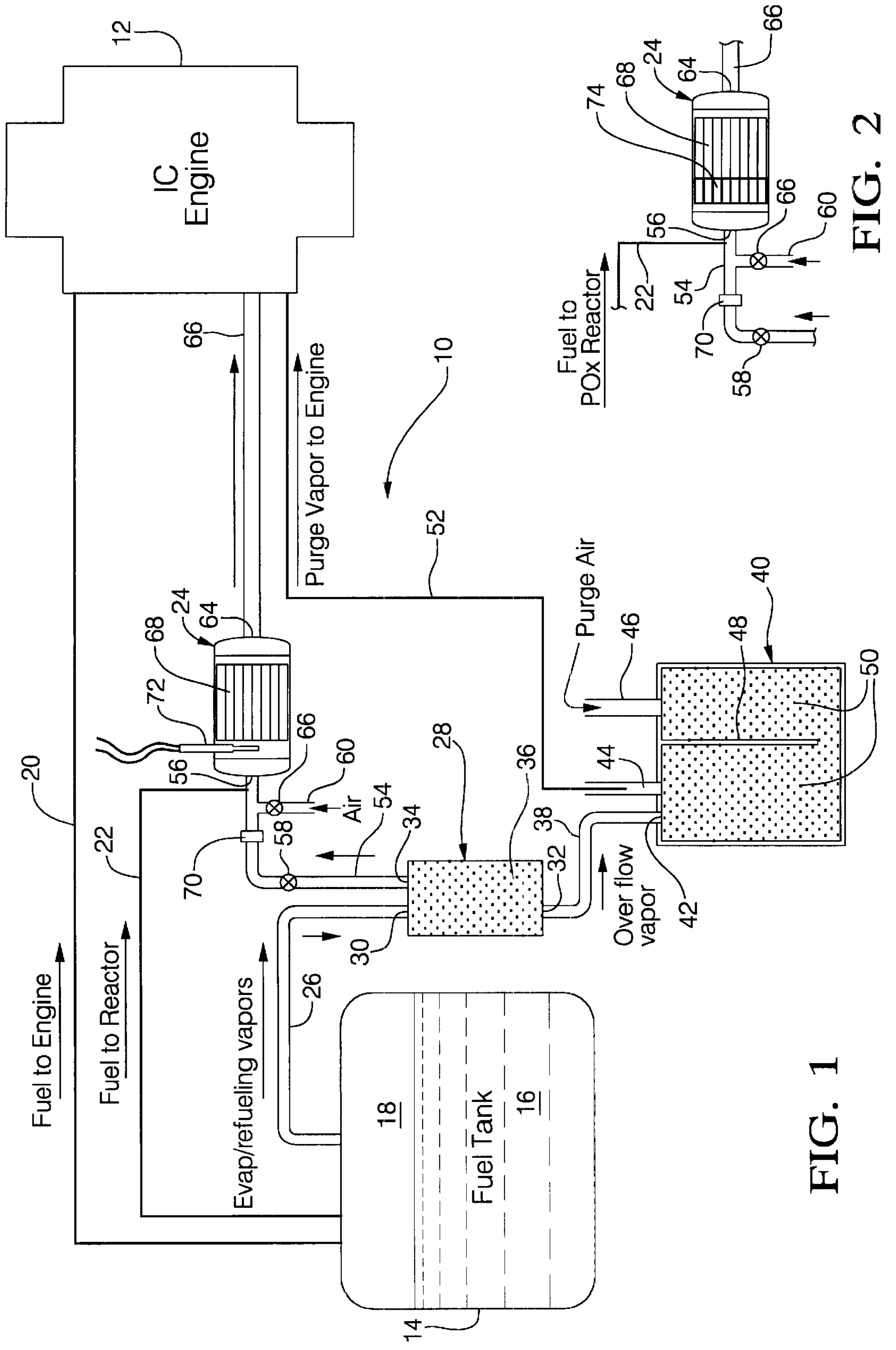
FIG. 1 is a schematic drawing showing the fuel and fuel vapor flow relationships of the combination of a fuel tank, POx vapor accumulator canister, POx reactor and internal combustion engine in accordance with one embodiment of the invention.
FIG. 2 is a schematic drawing of a portion of FIG. 1 showing a second embodiment, the use of electrically-heated means for POx reactor catalyst light off.

FIG. 1 is a schematic view of a POx cold start system 10 for an automobile propelled by an internal combustion engine 12. In this embodiment, engine 12 uses a combination of gasoline and POx gas as fuel. Other engines may be designed to operate on POx gas alone. The gasoline and hydrogen-containing POx gas are introduced through separate and complementary fuel injection systems under the control of a suitably programmed engine or powertrain control module. Such dual fuelling systems are known and do not in themselves constitute this invention. But the purpose of introducing hydrogen with gasoline is to permit leaner operation of the engine, i.e., at a higher mass air-to fuel ratio (A/F) of, e.g., 17 to 20 as opposed to an A/F of about 14.7 for gasoline-fuelled engines. As stated, operation with gasoline and hydrogen at leaner fuel mixtures permits reduced fuel consumption and exhaust emissions.

Referring to FIG. 1, fuel tank 14 is designed in a known manner to contain liquid gasoline 16 with an overlying space 18 for air and fuel vapor. The tank also contains one or more fuel pumps, not shown, for the separate delivery of liquid gasoline through fuel line 20 to the fuel injection system, not shown, of engine 12 and through fuel line 22 to POx reactor 24. The gasoline is suitably injected into the inlet of reactor 24. These separate delivery systems are under control in a known way of a powertrain control module (PCM) not shown.

The vapor space 18 of fuel tank 14 is vented through vent line 26 to POx vapor accumulator canister 28. As is well recognized, when tank 14 is heated by the ambient or by the return of hot unburned gasoline from the engine compartment or agitated by refilling, vapor is generated and an air/fuel mixture flows in line 26 to vapor inlet 30 of canister 28. Canister 28 is suitably a round can of molded thermoplastic material and, in addition to vapor inlet 30, it is provided with an overflow vapor outlet 32 and a vapor purge outlet 34. POx vapor accumulator canister 28 is filled with a suitable fuel vapor adsorbent material such as activated carbon. Fuel vapor flowing to canister 28 typically contains butanes and pentanes, and carbon is an efficient and practical adsorbent for these C4–C5 hydrocarbons.

When the carbon bed 36 is saturated with hydrocarbon vapor, the air/vapor mixture overflows through outlet 32 and flows through line 38 to a fuel evaporation control (EVAP) canister 40 of the type now found on virtually all current gasoline-fuelled vehicles. EVAP canister 40 typically contains a vapor inlet 42, a purge vapor outlet 44 and a purge air inlet/vent outlet 46 as illustrated in FIG. 1. EVAP canister 40 also often contains a partition 48 that effectively lengthens the vapor flow path from EVAP vapor inlet 42 to vapor vent outlet/purge air inlet 46. And the canister is filled with a high grade of fuel adsorbent activated carbon in a bed 50 on both sides of partition 48.

The operation of the EVAP canister 40 is well known. As a fuel vapor/air mixture enters inlet 42, vapor is adsorbed on bed 50 in the direction from inlet 42 down around partition 48 and upward to purge air inlet/vent outlet 46. Vapor purge outlet 44 is connected through vent line 52 to the fuel induction system, not shown, of the engine. Vent line 52 contains a valve, not shown, that is normally closed. During suitable modes of engine operation, the valve in vent line 52 is opened by signal from the PCM and the reduced pressure in the engine inlet system enables ambient air to flow in purge inlet 46, through carbon particle bed 50, stripping the particles of adsorbed vapor and carrying the vapor out outlet 44 through line 52 to the combustion cylinders of the engine where the temporarily stored vapor is burned.

In accordance with this invention, POx vapor canister complements EVAP canister 40 and performs a totally new function of providing light hydrocarbons for cold starting of POx reactor 24. As seen in FIG. 1, vapor purge outlet 34 of POx vapor canister 28 connects to vapor line 54 which in turn leads to the inlet 56 of POx reactor 24. The flow in vapor line 54 is controlled by valve 58. Vapor line 54 has an air inlet 60 with control valve 62 for management of A/F in the air/vapor stream flowing to POx reactor 24. Optionally, a suitable oxygen sensor, or the like, may be located in line 54 to estimate the proportions of air and fuel, i.e., the A/F, flowing to POx reactor 24. When such a sensor is used, its signal is considered by the PCM in controlling the opening of air valve 62 for adjustment of the A/F of the air/vapor mixture entering the POx reactor.

POx reactor 24 is illustrated as a horizontally disposed, conventional circular cylindrical vessel with an air/hydrocarbon vapor mixture inlet 56 at one end and a POx gas outlet 64 at the other end. Gas outlet 64 is connected through line 66 to the POx gas induction system, not shown, of the engine. POx reactor 24 contains a bundle 68 of tubular flow passages, the interior walls of which are coated with a suitable POx catalyst material such as finely divided Pd. The specific design of the reactor and the formulation and preparation of the catalyst are not critical to the practice of this invention. In the embodiment shown in FIG. 1, POx reactor 24 contains a glow plug or spark plug or other suitable ignition device 72 at the upstream end of the bundle 68 of flow passages for igniting the air/vapor mixture for purposes to be described.

A critical feature of this invention is the use of the POx reactor vapor accumulation canister 28 in FIG. 1. As one considers the flow of fuel vapor and air from fuel tank 14 through vent line 26, it is realized that the POx vapor canister remains full (saturated) all the time. All of the diurnal, running loss, and refueling vapor generated in the fuel tank 14 is first stored in POx canister 28 and the overflow goes to EVAP canister 40. When the engine is running and the PCM commands purging of the EVAP canister 40, the valve in purge line 52 is opened and the air vapor flow through the EVAP canister bypasses the POx canister 28. Thus, the POx canister is not purged by the engine during EVAP canister purging.

However, during cold start engine cranking, the EVAP purge line 52 is closed and air is drawn through the EVAP purge inlet 46, through the EVAP bed 50 and then through the POx vapor canister 28 into the POx reactor 24. In other words, the cranking engine draws the vapor from EVAP canister 40 and then through the POx canister 28 to the POx reactor 24. At times other than cold start, the POx canister will enhance the operation of vehicle EVAP emission control system by providing additional vapor storage capacity and additional EVAP canister purge during POx cold start. The added fuel vapor storage will reduce tank fuel weathering because vapor generated in normal operation will be stored and used for POx cold start. The POx vapor canister is sized to hold enough vapor for POx cold start for most vehicle driving scenarios, e.g., typical driving events of 2.5 trips/day, short trips, long trips, etc. In the case of very unusual driving scenarios, the vehicle computer can keep track of the vehicle operation and disable the POx cold start system when sufficient vapor does not exist.

Start-Up of POx Reactor

As suggested above, a preferred method of starting a POx reactor is to purge vapor from the POx vapor accumulator canister 28 with a flow of air and then convey the fuel vapor-rich/air mixture through line 54 to the inlet of the reactor 24. The intent is to burn the mixture in the reactor in order to heat the catalyzed flow passages 68.

The canister purge vapors are mostly butanes and pentanes, and average molecular weight is about the same as that of pentane. Assuming that the POx canister vapor is pentane, combustion of canister vapor can be represented by the following equation:

$$C_5H_{12}+8O_2+30.1N_2=5CO_2+6H_2O+30.1N_2+782\ \text{Kcal/mole}$$

After light-off of the POx reactor catalyst, the production of POx gas for either engine or fuel cell operation can be continued using available vapor from the POx vapor canister or the source of fuel can be changed to vapor or liquid gasoline from fuel tank 14. The partial oxidation of liquid gasoline to hydrogen and CO is approximated by the equation in the Background section of this specification above, while the partial oxidation of the POx canister vapor can be represented by the following equation:

$$C_5H_{12}+2.5O_2+9.4N_2=5CO+6H_2+9.4N_2+\text{Heat}$$

The heating of the catalyst to its light-off temperature can be accomplished either by catalytic oxidation/combustion or by ignition/ combustion as described below. But as implied in the above equation for the combustion of the canister vapor, the vapor air mixture may require dilution with air for better combustion. Accordingly, an effort is made to add an appropriate amount of air to the stream to bring its A/F closer about 15 to increase the effective heat of combustion. Valve 62 controlled air inlet 60 is employed for this purpose.

The practice of this invention is deemed applicable to POx reactors used with engines or fuel cells. In either application, it is likely and preferred that the control of POx vapor canister purging and the adjustment of its A/F by dilution with air will be managed by a programmed computer such as a PCM in the engine application or a similar control module in POx fuel supplied fuel cell. Such a computer control module will be provided with ambient temperature data from a temperature sensor, not shown, and may have data from an oxygen sensor 70 in the POx vapor purge line 54 upstream of air valve 60. The oxygen sensor, or other sensor for determining the proportions of air and fuel vapor in the purge stream, can provide the control module with sufficient information to control air additions through valve 62 and air inlet 60 to form suitable mixtures for combustion during reactor startup and for the partial oxidation reaction during POx generation.

A/F sensor input to the control module may be supplemented with or replaced with fuel vapor pressure data stored in the computer memory. For example, representative Reid Vapor Pressure (RVP) data over a range of potential ambient temperatures and for different gasolines formulated for the various seasons is used. The RVP data is used to predict the vapor content of an air purged stream from the POx vapor accumulator canister 28 and an air tank fuel vapor 18 over a range of useful ambient temperatures. This data is stored in the memory of the control module for the vapor stream approaching the POx reactor and is queried by the computer based on current temperature.

After the A/F of the purge POx vapor is adjusted the combustible stream enters the POx reactor at reactor inlet 56, combustion must be initiated for cold start of the reactor 24. In one embodiment, ignition of the air/vapor mixture is accomplished by, e.g., glow plug or spark plug ignition 72 (in FIG. 1). In another embodiment, the front end (74 in FIG. 2) of the catalyzed tube bundle contains an integral electrical resistance heating element for quickly heating the upstream end of the tube bundle 68 to a catalyst light-off temperature and the hot catalyst initiates the oxidation reaction.

In the first embodiment, the heat of the glow plug or the energy of a spark heats the butane/pentane-containing mixture above their autoignition temperatures, about 370° C. and 260° C., respectively. The combustion flame propagates upstream far enough to sustain combustion within POx reactor 24, and the hot combustion stream heats the tube bundle 68 to its operating temperature. After light-off, the POx canister vapor can be used until the POx reformer temperature reaches the operating temperature of, e.g., 600° C. to 800° C. Usually less than 5 g of hydrocarbon vapor (butanes and pentanes) can heat 50 cc catalyst from 0° C. to 400° C. Once the catalyst bed reaches operating temperature (600° C. to 800° C.), valves 58 and 60 (FIG. 1) will be adjusted to obtain proper HC/air mixture (A/F=5) for partial oxidation. Meanwhile, the combustion exhaust from the POx reactor is drawn through line 66 parallel to the separate air/gasoline mixture into the combustion chambers of the cold cranking engine.

The POx canister vapor can thus be used for the light-off heating and for producing POx gas until vaporized gasoline is available for the POx reformer. Therefore, the POx canister may be expected to supply, e.g., 20 to 30 g of hydrocarbon vapor for each cold start. A typical vehicle evaporative fuel vapor generation from the fuel tank will be sufficient for POx reformer cold start. The engine manifold vacuum can be used to draw the vapor from the POx canister into POx reformer. However, if one wishes to start the reformer before the engine cold start cranking, it may require an electrical pump to draw the vapor into the POx reformer.

In the embodiment shown in FIG. 2, the electrically-heated catalyst bed portion 74 of tube bundle 68 serves a function like that of the glow plug/spark igniter. With respect to the flow of the air/fuel vapor mixture, heated bed portion 74 contains catalyzed surface, tubular flow passages and electrical resistance heating means and is located at the upstream end of the tube bundle 68. The heated end of the reactor sustains catalytic oxidation in the air/hydrocarbon stream until the whole catalytic reactor is at light off temperature and the A/F of the incoming air/vapor is changed as described to an A/F of about 5 for the POx reaction.

Figure 3:
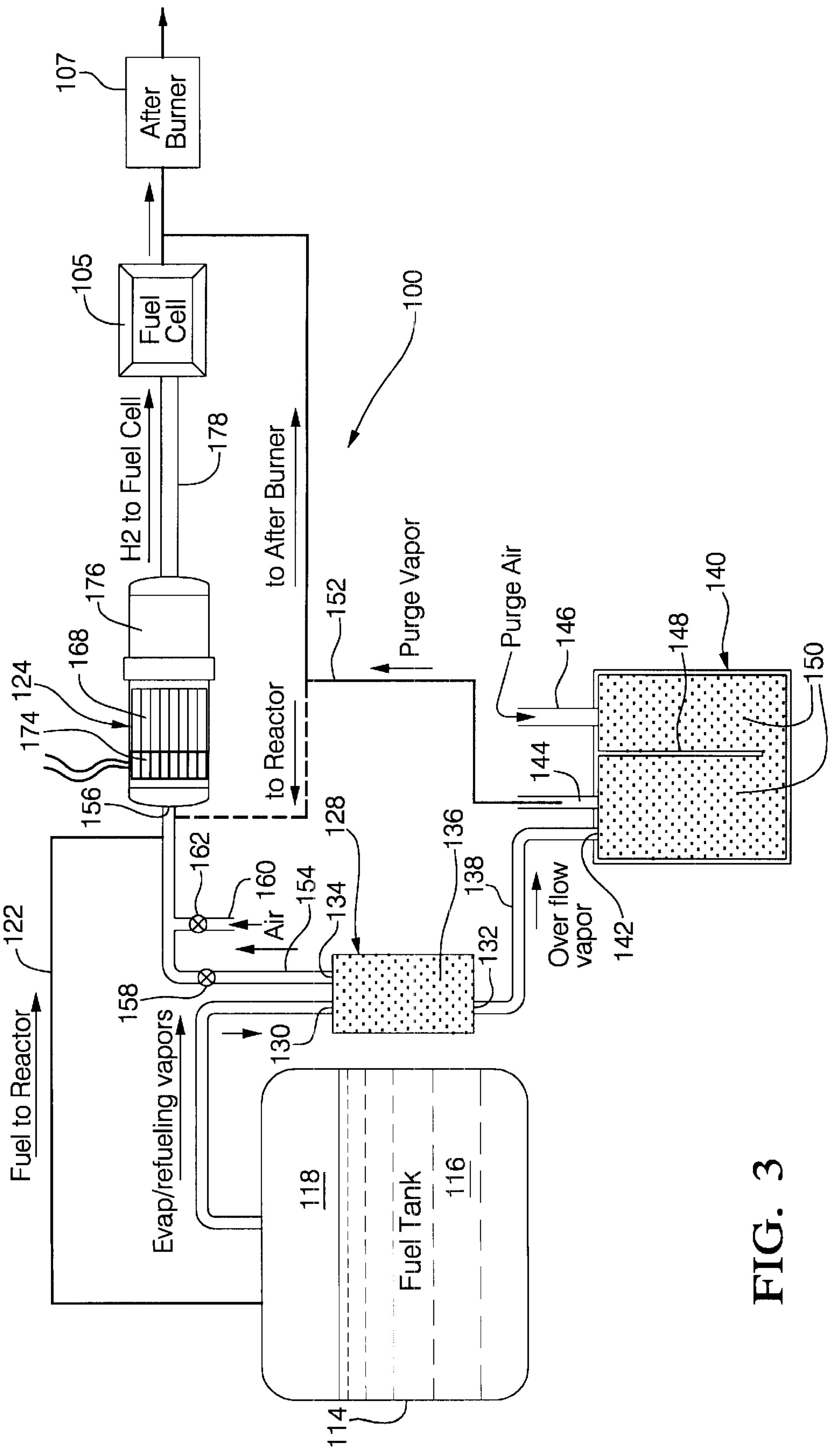
FIG. 3 is a schematic drawing of the fuel and fuel vapor flow relationships of a combination of a fuel tank, POx vapor accumulator canister, POx reactor and fuel cell in accordance with an embodiment of this invention.

FIG. 3 is a schematic representation of a cold start system for a POx reactor supplying hydrogen to a fuel cell-powered vehicle. Much of the system, including the fuel tank, vent lines, POx vapor accumulator canister, and the EVAP canister are like corresponding elements of the system for the vehicle engine depicted in FIG. 1. And corresponding parts are numbered 1xx, where the xx corresponds to the numerals of FIG. 1. The mode of operation of the POx accumulator canister in the fuel cell system is substantially the same as its operation in the engine system.

Referring to FIG. 3, system 100 includes a POx reactor 124 as a hydrogen source for on-board vehicular fuel cell 105. Fuel cell 105 may be of any known or suitable design for utilization of hydrogen and oxygen (air) in an electrochemical process for the generation of electrical energy. Since fuel cell 105 may not process all of the hydrogen supplied to it, the exhaust of the fuel cell 105 is conducted to an after burner 107 to consume any residual combustible material.

The system of FIG. 3 utilizes a gasoline tank 114 for liquid gasoline 116. Tank 114 includes a vapor space 118 for air and gasoline vapor. The tank may also contain a fuel pump, not shown, for the separate delivery of liquid gasoline through fuel line 122 for injection in POx reactor 124. This gasoline delivery system is under control in a known way of a fuel cell control module, not shown.

The vapor space 118 of fuel tank 114 is vented through vent line 126 to POx vapor accumulator canister 128. The reason for, and the design of, the POx vapor accumulator canister 128 is as described for the corresponding POx vapor accumulator canister 28 shown in FIG. 1. Vapor generated in tank 114 flows as part of an air/fuel mixture in line 126 to vapor inlet 130 of canister 128. Canister 128 is suitably a round can of molded thermoplastic material and, in addition to vapor inlet 130, it is provided with an overflow vapor outlet 132 and a vapor purge outlet 134. POx vapor accumulator canister 128 is filled with a bed 136 of suitable fuel vapor adsorbent material such as activated carbon.

When the carbon particle bed 136 is saturated with hydrocarbon vapor, the air/vapor mixture overflows through outlet 132 and flows through line 138 to a fuel evaporation control (EVAP) canister 140. EVAP canister 140 contains a vapor inlet 142, a purge vapor outlet 144 and a purge air inlet/vent outlet 146, as illustrated in FIG. 3. EVAP canister 140 also often contains a partition 148 that effectively lengthens the vapor flow path from EVAP vapor inlet 142 to vapor vent outlet/purge air inlet 146. And the canister is filled with a high grade of fuel adsorbent activated carbon particles in a bed 150 on both sides of partition 148.

The overflow vapor adsorption function of the fuel cell system EVAP canister 140 is very similar to the operation of canister 40 in the engine system described in FIG. 1. The fuel vapor/air mixture enters inlet 142 and vapor is adsorbed on bed 150 and any vapor overflow is vented through vent outlet/purge air inlet 146. Vapor purge outlet 144 is connected through purge vent line 152 either to the afterburner 107 or to the inlet 156 of the POx reactor 124. Purge vent line 152 contains a valve, not shown, that is normally closed except when EVAP canister 140 is to be purged during fuel cell operation.

During suitable modes of fuel cell 105 operation, or POx reactor 124 operation, the valve in vent line 152 is opened by signal from the fuel cell control module and purge air is made to flow by any suitable means into purge inlet 146, through carbon particle bed 150 stripping the particles of adsorbed hydrocarbon vapor and carrying the air/vapor mixture through purge outlet 144 and line 152 and branch line 180 to the POx reactor inlet 156 or to the afterburner 107 where the temporarily stored vapor is burned. EVAP vapor inlet 142 would normally be closed by means, not shown, during this mode of EVAP canister vapor purge. In the event that the draft of the POx reactor 124 or the afterburner 107 is insufficient to draw purge air through purge air inlet 146, a suitable blower, not shown, may be mounted in communication with the inlet 146 to force purge air through the EVAP canister 140 and to afterburner 107 and/or POx reactor 124.

Although the EVAP canister 140, if used, is purged during fuel cell operation in a different manner than EVAP canister 40 in the vehicle engine system (FIG. 1), the POx vapor accumulation canister serves substantially the same function in both systems. As seen in FIG. 3, vapor purge outlet 134 of POx vapor canister 128 connects to vapor line 154 which in turn leads to the inlet 156 of POx reactor 124. The flow in vapor line 154 is controlled by valve 158. Vapor line 154 has an air inlet 160 with control valve 162 for management of A/F in the air/vapor stream flowing to POx reactor 124. Optionally, a suitable sensor like that shown at 70 in FIG. 1 may be located in line 154 to estimate the proportions of air and fuel, i.e., the A/F, flowing to POx reactor 124. When such a sensor is used, its signal is considered by the fuel cell control module in controlling the opening of air valve 162 for adjustment of the A/F of the air/vapor mixture entering the POx reactor 124.

As described above, RVP data may be used in combination with or in place of a sensor to estimate the hydrocarbon content of the air/vapor mixture in line 154 flowing to POx reactor 124.

Purge air flow through EVAP canister 140 and POx vapor accumulation canister 128 during POx reactor cold start may be caused by the draft of the operating fuel cell system or by an air compressor as suggested above.

The cold starting of POx reactor in the fuel cell system can use any of the strategies described with respect to the engine system. As illustrated in FIG. 3, POx reactor 124 comprises an inlet 156, an electrically-heated, catalytic reactor portion 174 and main reactor tube bundle 168. At the downstream end of POx reactor 124 is a carbon monoxide processor section 176 for freeing the process stream of carbon monoxide. The hydrogen-containing stream exits processor 176 through line 178 and into fuel cell 105.

After cold startup of the POx reactor 124, usage of purge vapor. from canister 128 is discontinued by closing purge valve 158 in line 154. The supply of gasoline to POx reactor 124 is via liquid line 122 directly from tank 114. Of course, vapor from tank 114 can continue to flow through vent line 126 for storage in POx vapor accumulation canister 128 in preparation for the next cold start.

Thus, this invention provides a gasoline vapor storage system for automotive vehicles utilizing an on-board POx fuel reactor to supply a hydrogen-enriched fuel to an engine or fuel cell. The storage system operates in combination with the fuel tank and the EVAP canister normally used on the vehicle. The system utilizes a separate gasoline vapor adsorbent bed upstream of the EVAP canister to provide an accessible and controllable source of readily burned hydrocarbon vapor for the start-up of the POx reactor at low ambient temperatures. This vapor accumulator canister system for POx reactor starting has been described in terms of a few preferred embodiments. However, other embodiments could readily be adapted by one skilled in the art and, accordingly, the scope of the invention is limited only by the following claims.

What is claimed is:

1. A gasoline vapor storage system for an automotive vehicle of the type having a liquid gasoline storage tank with an air and gasoline vapor space above the liquid level of said gasoline, a gasoline vapor evaporation control (EVAP) adsorptive canister in vapor flow communication with said storage tank and an on-vehicle reactor for partial oxidation (POx) of gasoline to a hydrogen-containing fuel mixture for an internal combustion engine or a fuel cell motive source, said system being used during starting of said POx reactor and comprising in combination a vapor accumulation canister for POx reactor vapor feed, said vapor accumulation canister comprising a vapor inlet, a bed of gasoline vapor adsorbent material providing a vapor flow path from said vapor inlet through said bed to an overflow vapor outlet, said vapor accumulation canister further comprising a purge vapor outlet adjacent the vapor inlet portion of said bed;

a vent passage from said gasoline tank air and gasoline vapor space to said vapor inlet of said vapor accumulation canister;

a vent line from said overflow vapor outlet to a vapor inlet of said EVAP adsorptive canister; and a vapor purge line from said purge vapor outlet for delivery of an air and gasoline vapor mixture to said on-vehicle reactor for use in POx reaction start-up in said reactor.

2. A gasoline vapor storage system as recited in claim 1 further comprising an air inlet to said vapor purge line for increasing the mass air-to-fuel ratio of an air and gasoline vapor mixture in said vapor purge line.

3. A gasoline vapor storage system as recited in claim 1 further comprising heating means within said reactor for initiating combustion and catalytic reaction of said air and gasoline vapor mixture in said reactor.

4. A gasoline vapor storage system as recited in claim 1 comprising means external to said engine or fuel cell for inducing the flow of ambient air through said vapor accumulation canister from said overflow outlet through said bed and through said purge vapor outlet to remove vapor adsorbed on said bed.

5. A gasoline vapor storage system as recited in claim 1 which uses air induction means associated with said engine to induce the flow of ambient air through said vapor accumulation canister from said overflow outlet through said bed and through said purge vapor outlet to remove vapor adsorbed on said bed.

6. A gasoline vapor storage system as recited in claim 1 which uses air induction means associated with said fuel cell to induce the flow of ambient air through said vapor accumulation canister from said overflow outlet through said bed and through said purge vapor outlet to remove vapor adsorbed on said bed.

7. A gasoline vapor storage system as recited in claim 3 comprising glow plug means for initiating said combustion.

8. A gasoline vapor storage system as recited in claim 3 comprising spark plug means for initiating said combustion.

9. A gasoline vapor storage system as recited in claim 3 comprising electrical resistance heating means for initiating said catalytic reaction.

10. A method for start-up of an on-board automotive vehicle reactor for partial oxidation (POx) of gasoline to a hydrogen-containing fuel for a motive power source of said vehicle, said reactor having a POx reaction temperature above ambient temperature of said vehicle, said vehicle comprising a liquid gasoline storage tank with an air and gasoline vapor space above the liquid level of said gasoline and a gasoline vapor evaporation control (EVAP) adsorptive canister in vapor flow communication with said storage tank, said method comprising continually venting gasoline vapor from said storage tank vapor space to a vapor accumulation canister for POx reactor vapor feed, said canister comprising a bed of gasoline vapor adsorbent material for temporary storage of said gasoline vapor;

venting any vapor overflow from said accumulation canister to said EVAP canister for temporary storage therein, and during a period of start-up of said POx reactor;

effecting a flow of ambient air, first through said EVAP canister, and then through said accumulation canister to thereby purge stored gasoline vapor; and conducting the flow of the resultant mixture of air and vapor to said reactor for use in heating said reactor to its said POx reaction temperature.

11. A method for start-up of an on-board automotive vehicle POx reactor as recited in claim 10 comprising determining whether an amount of additional ambient air flow need be added to said resultant mixture flow of air and vapor to increase its mass air-to-fuel ratio (A/F) to a value suitable for combustion in said reactor and, if so determined, effecting said additional air flow.

12. A method for start-up of an on-board automotive vehicle POx reactor as recited in claim 11 comprising adding air to increase said A/F to a value of about 14 to about 15.

13. A method for start-up of an on-board automotive vehicle POx reactor as recited in claim 10 comprising heating said reactor by catalyzed exothermic reaction of said resultant mixture.

14. A method of start-up of an on-board automotive vehicle POx reactor as recited in claim 10 comprising heating said reactor by catalyzed combustion of said resultant mixture.

* * * * *